US012587556B2

(12) United States Patent
Park et al.

(10) Patent No.: US 12,587,556 B2
(45) Date of Patent: Mar. 24, 2026

(54) SERVER AND METHOD FOR STORING AND MANAGING ONLINE THREAT DATA

(71) Applicant: S2W INC., Seongnam-si (KR)

(72) Inventors: Soo Yeon Park, Seoul (KR); Sang Duk Suh, Seongnam-si (KR); Jae Ki Kim, Changwon-si (KR)

(73) Assignee: S2W INC., Seongnam-si (KR)

( * ) Notice: Subject to any disclaimer, the term of this patent is extended or adjusted under 35 U.S.C. 154(b) by 85 days.

(21) Appl. No.: 18/397,548

(22) Filed: Dec. 27, 2023

(65) Prior Publication Data

US 2024/0250972 A1     Jul. 25, 2024

(30) Foreign Application Priority Data

Dec. 29, 2022     (KR) ........................ 10-2022-0189561

(51) Int. Cl.
H04L 29/06 (2006.01)
H04L 9/40 (2022.01)
(52) U.S. Cl.
CPC ............................... H04L 63/1425 (2013.01)
(58) Field of Classification Search
CPC . H04L 63/1425; G06F 16/313; G06F 16/316; G06F 16/332; G06F 16/338; G06F 16/901; G06F 16/951
See application file for complete search history.

(56) References Cited

U.S. PATENT DOCUMENTS

| | | | | |
|---|---|---|---|---|
| 8,701,162 | B1 * | 4/2014 | Pedersen | ............... G06F 21/564 714/37 |
| 10,972,484 | B1 * | 4/2021 | Swackhamer | ...... H04L 63/1416 |
| 11,729,197 | B2 * | 8/2023 | Cruz | ........................ G06F 8/658 |
| 2018/0115570 | A1 * | 4/2018 | Ollmann | ............... H04L 63/145 |

FOREIGN PATENT DOCUMENTS

| | | |
|---|---|---|
| KR | 10-2016-0109870 A | 9/2016 |
| KR | 10-2021-0083936 A | 7/2021 |

OTHER PUBLICATIONS

Communication issued Mar. 7, 2025 in Korean Patent Application No. 10-2022-0189561.

* cited by examiner

*Primary Examiner* — Ka Shan Choy
(74) *Attorney, Agent, or Firm* — USX IP LLC

(57) ABSTRACT

A server for storing and managing online threat data according to an embodiment of the present disclosure includes: an online threat data collection unit that collects online threat data from an online threat data providing server; an online threat data analysis unit that analyzes the online threat data to extract an online threat string, and uses the online threat string as an index to generate information for retrieving the online threat data; and a database in which information generated by the online threat data analysis unit is stored.

6 Claims, 5 Drawing Sheets

| ID | TEXT |
|---|---|
| doc_id_1 | Turning a scan process into a fuzz testing harness code means we should find the Processing component in target binary and minimize it. |
| doc_id_2 | Before we get into it, we found a previous research called loadlibrary by taviso which Contains a harness code that is made of ported windows dynamic link libraries to linux. |
| doc_id_3 | It targets x86 mpengine.dll with signal number RSIG_SCAN_STREAMBUFFER which is 0x403 in hex. |
| doc_id_4 | The harness code doesn't work on the latest mpengine.dll, so we tried to fix it by Reversing mpengine and mpsvc. |
| doc_id_5 | However, it only worked with simple binaries like EICAR, and timed out on more complex files. |
| doc_id_6 | Therefor, we decided to analyze the scan routine of Windows Defender. |

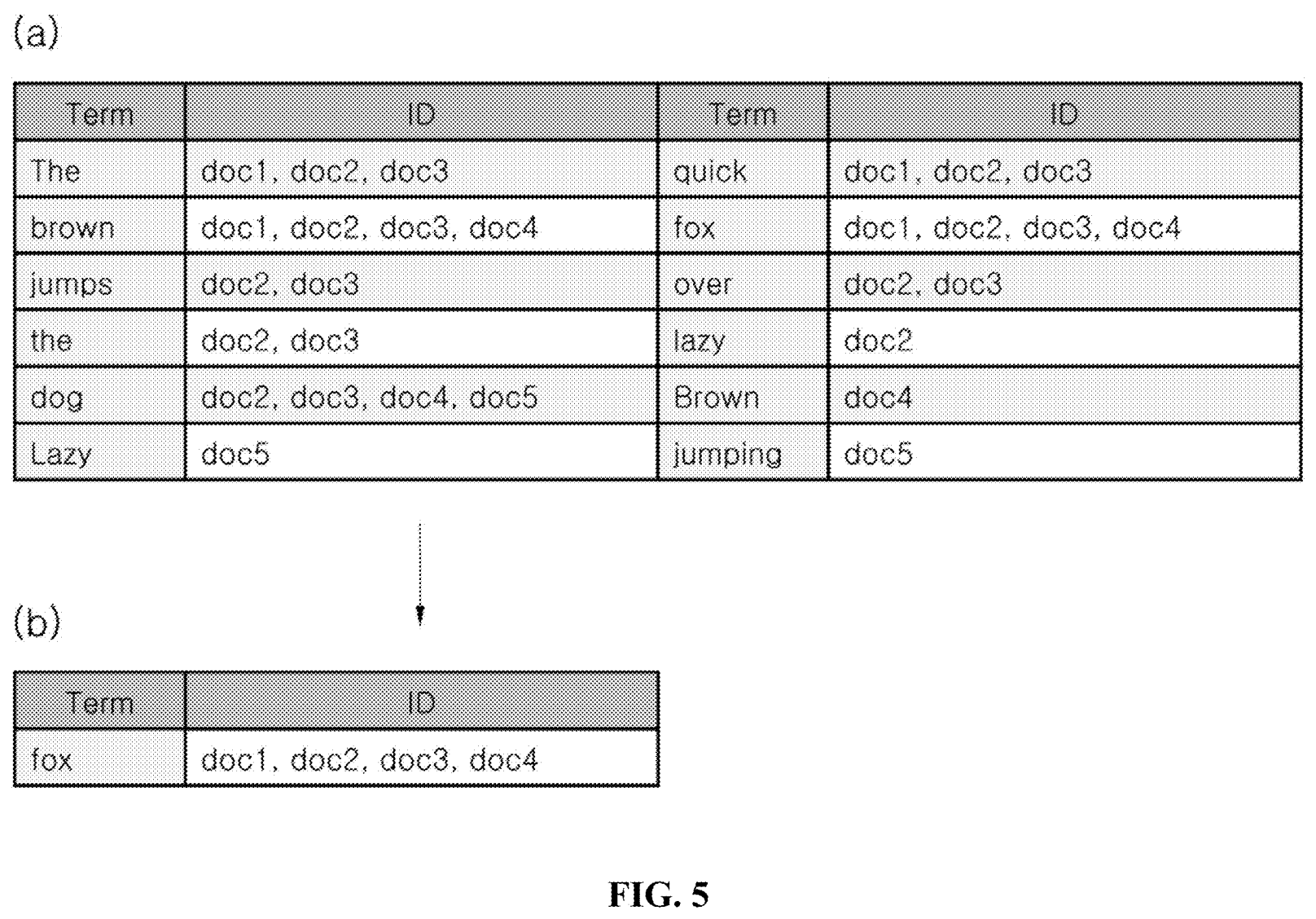

| Term | ID | Term | ID |
|------|-----|------|-----|
| The | doc1, doc2, doc3 | quick | doc1, doc2, doc3 |
| brown | doc1, doc2, doc3, doc4 | fox | doc1, doc2, doc3, doc4 |
| jumps | doc2, doc3 | over | doc2, doc3 |
| the | doc2, doc3 | lazy | doc2 |
| dog | doc2, doc3, doc4, doc5 | Brown | doc4 |
| Lazy | doc5 | jumping | doc5 |

(b)

| Term | ID |
|------|-----|
| fox | doc1, doc2, doc3, doc4 |

FIG. 5

SERVER AND METHOD FOR STORING AND MANAGING ONLINE THREAT DATA

CROSS-REFERENCE TO RELATED APPLICATION

This application claims priority to and the benefit of Korean Patent Application No. 2022-0189561, filed on Dec. 29, 2022, the disclosure of which is incorporated herein by reference in its entirety.

BACKGROUND

1. Field of the Invention

The present disclosure relates to a server and method for storing and managing online threat data. More particularly, the present disclosure relates to a server and method for storing and managing online threat data, which are capable of accommodating both structured and unstructured data by generating a database with an inverted index structure based on an index of the online threat data.

2. Discussion of Related Art

With the development of the Internet, the globally connected cyber world has become as large and wide as the real world. Accordingly, cyber threats are also developing day by day and become more sophisticated and large-scale. The cyber threats are causing numerous damages, and the range of damage is becoming wider.

However, cyber defense technologies that respond to automated and intelligent cyber attacks are falling short of the cyber attacks. The reason why this situation is happening is because the number of cyber threat incident analysis experts who respond to the cyber threats is limited. Moreover, compared to the automation level of attack tools, the automation technology of tools that can be used for cyber threat response and analysis, such as incident analysis or malicious code analysis has not yet been completed due to technical limitations.

Therefore, recent attempts to resolve the problems of cyber threat analysis are continuing by transplanting professional skills of cyber threat incident analysis experts into artificial intelligence.

In relation to the cyber threat incidents, cyber threat information includes information widely shared in a standardized form, such as vulnerability information or malicious code features, and information that is spread simply and quickly in the form of short message information such as news, Blog, or tweet.

There are also several cyber intelligence services provided for the purpose of warning and responding to cyber threats. In most cases, users have to pay a paid subscription fee to use cyber intelligence services provided by major information security companies around the world.

Although various types of cyber threat data exist, most cyber attacks are very localized and temporary, so it is impossible to collect all information related to cyber attacks at once. In addition, certain cyber attacks related to some cyber threats may not be shared due to political/social/military reasons between countries.

Despite these various limitations, efforts to collect various types/large amounts of cyber threat information and analyze the cyber threat information from a big data perspective may continue in industry and academia.

The cyber threat data may be shared in a standardized form such as vulnerability information or malicious code features. Generally, however, intelligence reports, malicious code analysis reports, or vulnerability analysis reports that most clearly investigate/analyze cyber threats after a cyber threat incident are written and provided in an unstructured natural language.

SUMMARY OF THE INVENTION

The present disclosure is directed to providing a server and method for storing and managing online threat data, which are capable of accommodating both structured data and unstructured data by generating a database with an inverted index structure based on an index of online threat data.

The present disclosure is also directed to providing a server and method for storing and managing online threat data, which are capable of improving retrieve performance by extracting and providing an identifier of online threat data that matches an index corresponding to a specific threat indicator word in a database when a retrieval request is made for the online threat data including the specific threat indicator word.

The technical problems to be solved by the present disclosure are not limited to the above-described technical problems, and technical problems that are not mentioned will be clearly understood by those skilled in the art to which the present disclosure pertains from the present specification and the accompanying drawings.

According to an aspect of the present disclosure, there is provided a server for storing and managing online threat data, including: an online threat data collection unit that collects online threat data from an online threat data providing server; an online threat data analysis unit that analyzes the online threat data to extract an online threat string, and uses the online threat string as an index to generate information for retrieving the online threat data; and a database in which information generated by the online threat data analysis unit is stored.

The server for storing and managing online threat data may further include, when receiving an online threat data retrieval request message from a user terminal, an online threat data retrieval unit that extracts online threat data including a specific threat indicator word from the database based on the online threat data retrieval request message and provides the extracted online threat data to the user terminal.

According to another aspect of the present invention, there is provided a method of storing and managing online threat data, which is executed on a server for storing and managing online threat data, including: collecting online threat data from an online threat data providing server; analyzing the online threat data to extract an online threat string, and using the online threat string as an index to generate information for retrieving the online threat data; and building a database using the generated information.

The method of storing and managing online threat data may further include: receiving an online threat data retrieval request message from a user terminal; and extracting online threat data including a specific threat indicator word from the database based on the online threat data retrieval request message and providing the extracted online threat data to the user terminal.

Technical solutions of the present disclosure are not limited to the abovementioned technical solutions, and technical solutions that are not mentioned will be clearly understood by those skilled in the art to which the present disclosure pertains from the present specification and the accompanying drawings.

BRIEF DESCRIPTION OF THE DRAWINGS

The above and other aspects of the present disclosure will become more apparent to those of ordinary skill in the art by describing exemplary embodiments thereof in detail with reference to the accompanying drawings, in which:

FIG. 4 is an exemplary diagram for describing a general online threat data storage management process; and FIG. 5 is an exemplary diagram for describing an online threat data storage management process according to an embodiment of the present disclosure.

DETAILED DESCRIPTION OF EXEMPLARY EMBODIMENTS

Figure 1:
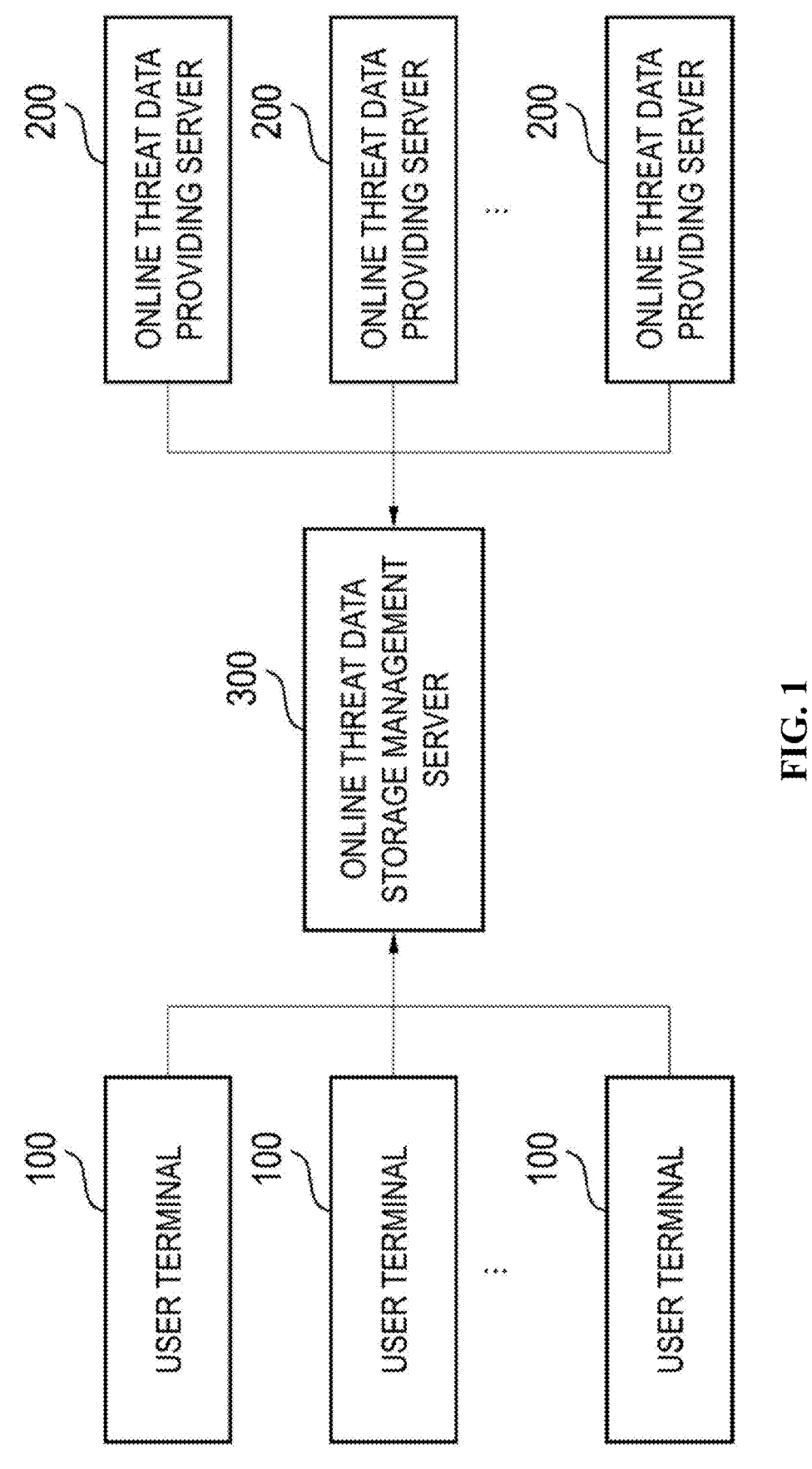
FIG. 1 is a diagram for describing an online threat data storage system according to an embodiment of the present disclosure.

Objects, features, and advantages of the present disclosure will become more obvious from the following detailed description provided in relation to the accompanying drawings. However, the present application may be variously modified and have several exemplary embodiments. Hereinafter, specific exemplary embodiments of the present disclosure will be illustrated in the accompanying drawings and be described in detail.

Same reference numerals denote same constituent elements throughout the specification. Further, elements having the same function within the scope of the same idea illustrated in the drawings of each embodiment will be described using the same reference numerals, and overlapping descriptions thereof will be omitted.

When it is determined that a detailed description for the known functions or configurations related to the present disclosure may obscure the gist of the present disclosure, detailed descriptions thereof will be omitted. In addition, numbers (for example, first, second, etc.) used in the description process of the present specification are only identification symbols for distinguishing one component from other components.

In addition, the terms "module" and "unit" for components used in the following embodiments are used only in order to easily make the disclosure. Therefore, these terms do not have meanings or roles that distinguish from each other in themselves.

Singular forms are intended to include plural forms unless the context clearly indicates otherwise.

In the following embodiments, the term "include," "have," or the like means that a feature or element described in the specification is present, and it does not preclude in advance the possibility that one or more other features or components may be added.

Sizes of components may be exaggerated or reduced in the accompanying drawings for convenience of explanation. For example, the size and thickness of each component illustrated in the drawings are arbitrarily indicated for convenience of description, and the present disclosure is not necessarily limited to the illustrated those.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via certain component interposed between the components.

For example, in the present specification, when components and the like are electrically connected, it includes not only a case where components are directly electrically connected, but also a case where components are indirectly electrically connected via certain component interposed between the components.

Hereinafter, a server and method for storing and managing online threat data according to exemplary embodiments of the present disclosure will be described with reference to FIGS. 1 to 5.

Among the terms used in this specification, "online threat data" includes data shared in a standardized form, such as vulnerability information or malicious code features, and data written and provided in an unstructured natural language, such as an intelligence reports, malicious code analysis reports, or vulnerability analysis reports that most clearly investigate/analyze cyber threats after a cyber threat incident. For example, the online threat data may be "The quick brown fox," "The quick brown fox jumps over the lazy dog," and the like.

The "online threat data" is built as graph data. In this case, the graph data refers to a database in a form that generalizes a structure and increases accessibility by storing data in the form of a graph. The graph database of the online threat data is configured in a form that stores threat resources and properties of the threat resources in a vertex, and records relationships in property values of edges connecting vertices different from the vertex. The vertex constitutes nodes of the graph.

As described above, the graph database for various threat resources collected through a network is very simple in its overall structure since it is composed only of the vertices and edges, thereby making it easy to establish a strategy to prevent attacks by the threat resources in advance.

However, the number of collected threat resources is generally very large, and numerous vertices may be included in the graph database. When the number of vertices becomes too large, access to the desired data becomes difficult.

FIG. 1 is a diagram for describing an online threat data storage system according to an embodiment of the present disclosure.

Referring to FIG. 1, the online threat data storage system includes one or more user terminals 100, one or more online threat data providing servers 200, and a server 300 for storing and managing online threat data.

The user terminal 100 is a terminal owned by a user. The user terminal 100 receives online threat data including a specific threat indicator word through the server 300 for storing and managing online threat data. The user terminal 100 may be implemented as a smart phone, tablet PC, etc.

When the user terminal 100 receives an online threat data retrieval request message including specific threat indicator word, the user terminal 100 provides the online threat data retrieval request message to the server 300 for storing and managing online threat data. Thereafter, the user terminal 100 may receive and display the online threat data including the specific threat indicator word from the server 300 for storing and managing online threat data.

The online threat data providing server 200 provides the online threat data to the server 300 for storing and managing online threat data in response to a request from the server 300 for storing and managing online threat data.

This online threat data providing server 200 includes a Structured Threat Information expression (STIX) server, an open Trusted Automated exchange of Indicator Information (TAXII) server, an external cyber threat response database, and/or a Malware sample. The TAXII client may use a TAXII protocol to collect online threat data from the STIX server, the open TAXII server, or the external cyber threat response database and provide the collected online threat data to the server 300 for storing and managing online threat data.

The server 300 for storing and managing online threat data collects the online threat data from the online threat data providing server 200, analyzes the collected online threat data, and builds a database for retrieving the online threat data.

The server 300 for storing and managing online threat data analyzes the collected online threat data and extracts information for building the database. The extraction of the information for building the database will be described in more detail as follows.

First, the server 300 for storing and managing online threat data analyzes the collected online threat data to extract the online threat string.

As an example, the server 300 for storing and managing online threat data may extract some function strings of malicious Uniform Resource Locator (URL), malicious domains, and/or malicious Internet Protocol (IP) addresses included in the online threat data.

Thereafter, the server 300 for storing and managing online threat data extracts tokens based on a space from the online threat string and determines whether the extracted tokens are stored as indexes in the database.

For example, the server 300 for storing and managing online threat data extracts the tokens "The," "quick," "brown," and "fox" based on a space from "The quick brown fox," which is the online threat string, and determines whether "The," "quick," "brown," and "fox" are stored as indexes in the database.

As a result of the determination, when the tokens extracted from the online threat string are stored as the indexes in the database, the server 300 for storing and managing online threat data stores an identifier of the corresponding online threat data in an identifier item of the online threat data corresponding to the index in the database.

For example, in the state in which the tokens "The," "quick," "brown," and "fox" are extracted based on a space from "The quick brown fox," which is an online threat string of identifier "doc1," when the token "fox" among the extracted tokens is stored as an index in the database, the server 300 for storing and managing online threat data stores the identifier "doc1" in the identifier item of the online threat data corresponding to the index "fox" in the database.

As a result of the determination, when the tokens extracted from the online threat string are not stored as the indexes in the database, the server 300 for storing and managing online threat data stores the extracted tokens as an index in the database and then stores an identifier of the corresponding online threat data in an identifier item of the online threat data corresponding to the index stored in the database.

For example, in the state in which the tokens "The," "quick," "brown," and "fox" are extracted based on a space from "The quick brown fox" which is an online threat string of identifier "doc2," when the token "The" among the extracted tokens is not stored as an index in the database, the server 300 for storing and managing online threat data stores the token "The" as an index in the database and then stores the identifier "doc2" in the identifier item of the online threat data corresponding to the index "The" in the database.

Thereafter, the server 300 for storing and managing online threat data assigns frequency tags to the indexes of the database and then optimizes the database based on the frequency tags. The database may be optimized in various methods, which will be described in more detail as follows.

According to one embodiment, the server 300 for storing and managing online threat data measures the number of identifiers of online threat data corresponding to each index in the database as a frequency.

Thereafter, the server 300 for storing and managing online threat data assigns labels indicating the frequency to each index and then sorts the indexes according to the frequency, thereby updating the database.

For example, the server 300 for storing and managing online threat data assigns labels indicating the frequency to each index, such as (frequency: 1000, "The"), (frequency: 34, "brown"), (frequency: 24, "dog"), and (frequency: 25, "lazy"), and then sorting the indexes according to the frequency, thereby updating the database.

According to another embodiment, the server 300 for storing and managing online threat data analyzes the meaning of each index in the database, groups indexes with different morphemes but the same meaning into one pair, and merges the identifiers of the online threat data for each grouped index.

For example, in the database, the indexes "the" and "The" have the same meaning. Therefore, the server 300 for storing and managing online threat data groups the indexes "the" and "The" into "the, The," and merges identifiers "doc2 and doc3" of the online threat data corresponding to the index "the" and the identifiers "doc1, doc2, and doc3" of the online threat data corresponding to index "The" to generate the "doc1, doc2, and doc3."

As in the above-described embodiments, the server 300 for storing and managing online threat data optimizes the database to enable quick retrieve when retrieving online threat data including a specific threat indicator word from the database in the future.

Thereafter, the server 300 for storing and managing online threat data retrieves the identifier of the online threat data including the specific threat indicator word from the database according to the request of the user terminal 100, and then provides the online threat data corresponding to the retrieved identifier to the user terminal 100.

Specifically, when receiving an online threat data retrieval request message including the specific threat indicator word from the user terminal 100, the server 300 for storing and managing online threat data may extract the specific threat indicator word from the online threat data retrieval request message.

Thereafter, the server 300 for storing and managing online threat data determines whether an index matching the specific threat indicator word exists among the indexes in the database, and as a result of the determination, extracts the identifier of the online threat data corresponding to the index and provides the extracted identifier to the user terminal 100.

For example, the server 300 for storing and managing online threat data extracts the specific threat indicator word "fox" from the online threat data retrieval request message received from the user terminal 100, extracts identifiers "doc1, doc2, doc3, and doc4" of the specific threat indicator word corresponding to the "fox" from the database, and provides online threat data corresponding to the extracted identifiers to the user terminal 100.

The index used in this disclosure is like a browser page that allows users to see how many pages of contents of main keywords at an end of a book exist. Therefore, when there are indexes, the identifiers "doc1, doc2, doc3, and doc4" of the online threat data including the specific threat indicator word "fox" may be extracted.

Figure 2:
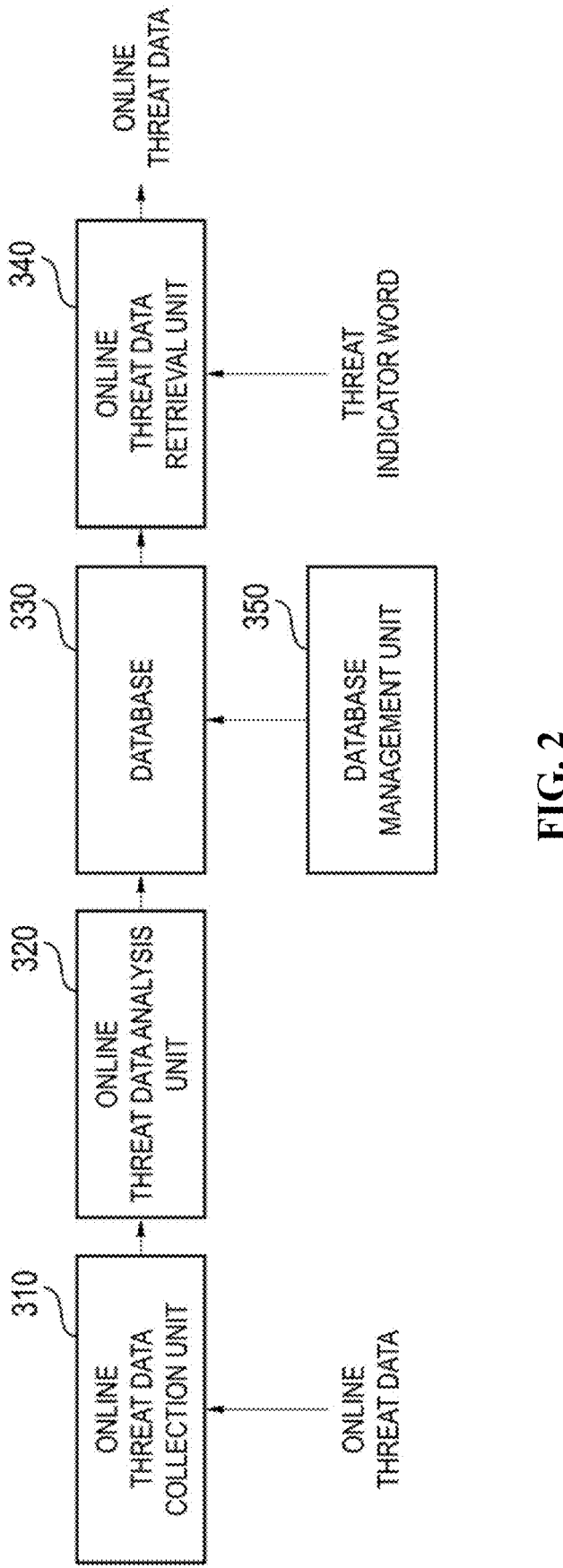
FIG. 2 is a diagram for describing an internal structure of a server for storing and managing online threat data according to an embodiment of the present disclosure.

FIG. 2 is a diagram for describing an internal structure of a server for storing and managing online threat data according to an embodiment of the present disclosure.

Referring to FIG. 2, the server 300 for storing and managing online threat data includes an online threat data collection unit 310, an online threat data analysis unit 320, a database 330, an online threat data retrieval unit 340, and a database management unit 350.

According to one embodiment, the online threat data collection unit 310 collects online threat data from a plurality of sources and provides the collected online threat data to the online threat data analysis unit 320.

The online threat data collection unit 310 may include a TAXII client and/or a Malware analysis tool.

Here, a plurality of sources include a STIX server, an open TAXII server, an external cyber threat response database, and/or a Malware sample. The TAXII client may use a TAXII protocol to collect online threat data from the STIX server, the open TAXII server, or the external cyber threat response database and provide the collected online threat data to the online threat data analysis unit 320.

Here, the online threat data collection unit 310 may collect a Malware Attribute Enumeration and Characterization (MAEC) data file and/or a Malware Information Sharing Platform (MISP) data file from the external online threat response database as the online threat data.

According to another embodiment, the online threat data collection unit 310 may collect online threat data existing on the Internet site from Internet sites that provide online threat-related information pre-classified by its own experts, through website crawling.

In this case, when the collected online threat data is text data, the collected online threat data may be stored immediately. Here, the text data may be, for example, American Standard Code for Information Interchange (ASCII) text and/or Hypertext Markup Language (HTML). On the other hand, when the collected online threat data is binary data, only text data may be extracted using a predetermined program, and the extracted text data may be stored. Here, binary data may be stored in a form in which text is encoded through a separate process, such as PDF, HWP, and/or DOC file formats.

In addition, the online threat data collected may be unstructured data. The unstructured data may include reports written in an unstructured natural language such as cyber threat analysis reports, malicious code analysis reports, and vulnerability analysis reports and short messages related to cyber threats such as news, Blog, and tweet of Twitter.

In addition, the online threat data collected may be structured data. The structured data may include public Common Vulnerabilities and Exposures (CVE) and collected malicious code information that are provided by MITER Corporation.

The online threat data analysis unit 320 analyzes online threat data provided from the online threat data collection unit 310 and extracts information for building the database 330. The extraction of the information for building the database 330 will be described in more detail as follows.

First, the online threat data analysis unit 320 analyzes the online threat data provided from the online threat data collection unit 310 to extract the online threat string.

As an example, the online threat data analysis unit 320 may extract some function strings of malicious URL, malicious domains, and/or malicious IP addresses included in the online threat data.

Thereafter, the online threat data analysis unit 320 extracts tokens based on a space from the online threat string, and determines whether the extracted tokens are stored as indexes in the database 330.

For example, the online threat data analysis unit 320 extracts the tokens "The," "quick," "brown," and "fox" based on a space from "The quick brown fox" which is the online threat string, and determines whether "The," "quick," "brown," and "fox" are stored as indexes in the database 330.

As a result of the determination, when the tokens extracted from the online threat string are stored as the indexes in the database, the online threat data analysis unit 320 stores an identifier of the corresponding online threat data in an identifier item of the online threat data corresponding to the index in the database 330.

For example, in the state in which the tokens "The," "quick," "brown," and "fox" are extracted based on a space from "The quick brown fox" which is an online threat string of an identifier "doc1" when the token "fox" among the extracted tokens is stored as an index in the database 330, the online threat data analysis unit 320 stores the "doc1" in the identifier item of the online threat data corresponding to the index "fox" in the database 330.

As a result of the determination, when the tokens extracted from the online threat string are not stored as the indexes in the database 330, the online threat data analysis unit 320 stores the extracted token as an index in the database 330 and then stores an identifier of the corresponding online threat data in an identifier item of the online threat data corresponding to the index stored in the database.

For example, the online threat data analysis unit 320 extracts the tokens "The," "quick," "brown," and "fox" based on a space from "The quick brown fox" which is an online threat string of identifier "doc2." Thereafter, when the token "The" is not stored as an index in the database 330, the token "The" is stored as an index in the database 330 and then stores the "doc2" in an identifier item of the online threat data corresponding to the index "The" in the database 330.

The index extracted by the online threat data analysis unit 320 and the identifier of the online threat data are stored in the database 330 in correspondence with each other. In this case, the index of the database 330 may be determined according to the tokens extracted from the online threat data. The identifier of the online threat data corresponding to the index refers to the online threat data including the corresponding index.

The online threat data retrieval unit 340 retrieves the identifier of the online threat data including the specific threat indicator word from the database 330 according to the request of the user terminal 100, and then provides the online threat data corresponding to the retrieved identifier to the user terminal 100.

Specifically, when receiving an online threat data retrieval request message including the specific threat indicator word from the user terminal 100, the online threat data retrieval unit 340 may extract the specific threat indicator word from the online threat data retrieval request message.

Thereafter, the online threat data retrieval unit 340 determines whether an index matching the specific threat indicator word exists among the indexes in the database 330, and as a result of the determination, extracts the identifier of the online threat data corresponding to the index and provides the extracted identifier to the user terminal 100.

For example, the online threat data retrieval unit 340 extracts the specific threat indicator word "fox" from the online threat data retrieval request message received from the user terminal 100, extracts identifiers "doc1, doc2, doc3, and doc4" of the specific threat indicator word corresponding to the "fox" from the database 330, and provides online threat data corresponding to the extracted identifiers to the user terminal 100.

The index used in this disclosure is like a browse page that allows users to see how many pages contents of main keywords at an end of a book exist on. Therefore, when there are indexes, the identifiers "doc1, doc2, doc3, and doc4" of the online threat data including the specific threat indicator word "fox" may be extracted.

The database management unit 350 assigns frequency tags to the indexes of the database 330 and then optimizes the database 330 based on the frequency tags. The database 330 may be optimized in various methods, which will be described in more detail as follows.

According to one embodiment, the database management unit 350 measures the number of identifiers of the online threat data corresponding to each index in the database 330 as a frequency.

Thereafter, the database management unit 350 assigns labels indicating the frequency to each index and then sorts the indexes according to the frequency, thereby updating the database 330.

For example, the database management unit 350 assigns labels indicating the frequency to each index, such as (frequency: 1000, "The"), (frequency: 34, "brown"), (frequency: 24, "dog"), and (frequency: 25, "lazy"), and then sorting the indexes according to the frequency, thereby updating the database 330.

According to another embodiment, the database management unit 350 analyzes the meaning of each index in the database 330, groups indexes with different morphemes but the same meaning into one pair, and merges the identifiers of the online threat data for each grouped index.

For example, in the database 330, the indexes "the" and "The" have the same meaning. Therefore, the database management unit 350 groups the indexes "the" and "The" into "the, and The," and merges identifiers "doc2 and doc3" of the online threat data corresponding to the index "the" and the identifiers "doc1, doc2, and doc3" of the online threat data corresponding to index "The" to generate the "doc1, doc2, and doc3."

As another example, in the database 330, indexes "jumps" and "jumping" have the same meaning. Therefore, the database management unit 350 groups the indexes "jumps" and "jumping" into "jumps, jumping," and merges identifiers "doc2, and doc3" of the online threat data corresponding to the index "jumps" and identifier "doc5" of the online threat data corresponding to index "jumping" to generate the "doc2, doc3, and doc5."

As described above, the database management unit 350 optimizes the database 330 to enable quick retrieve when retrieving the online threat data including specific threat indicator words from the database 330 in the future.

Figure 3:
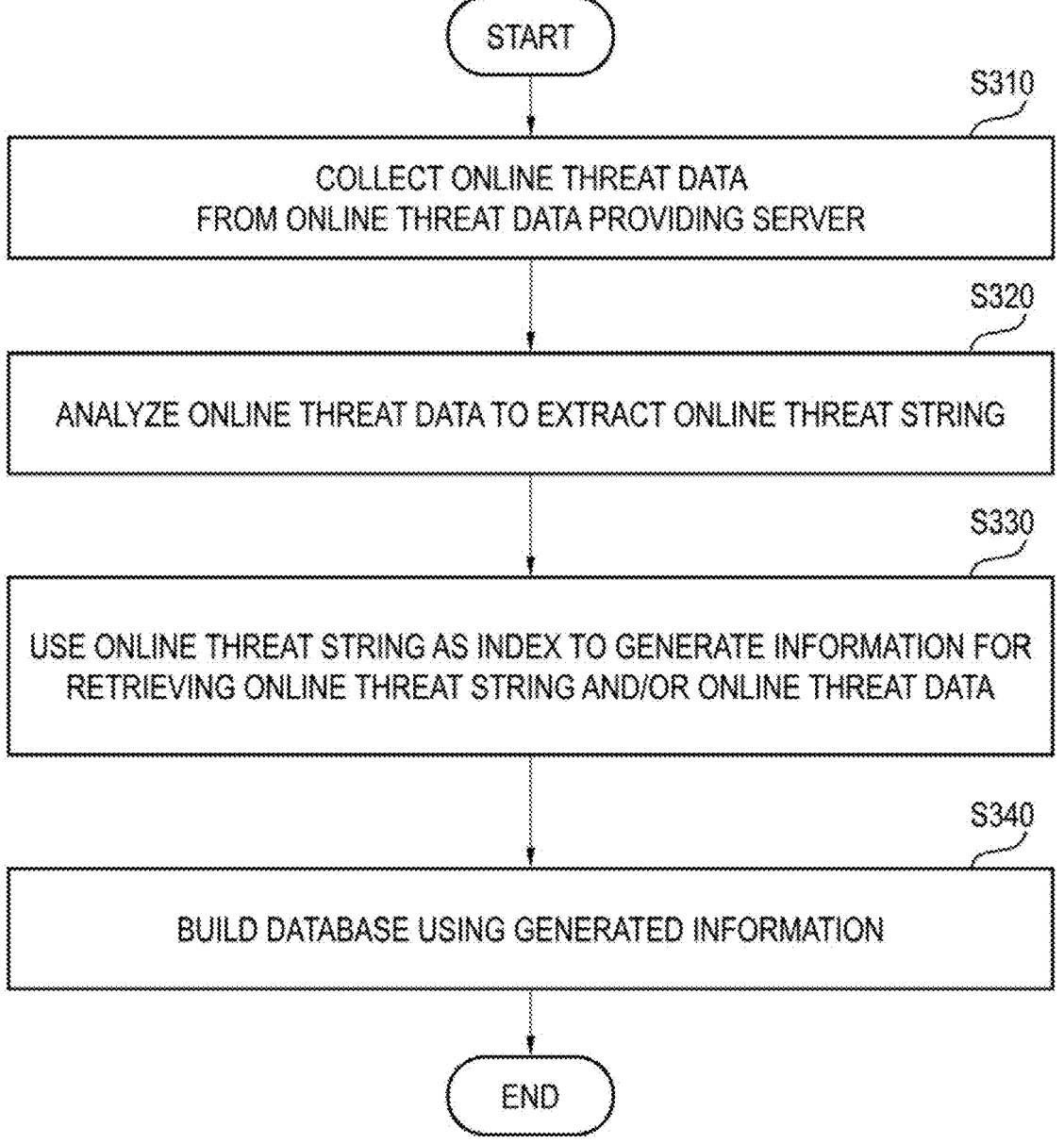
FIG. 3 is a flowchart for describing a method of storing and managing online threat data according to an embodiment of the present disclosure.

FIG. 3 is a flowchart for describing a method of storing and managing online threat data according to an embodiment of the present disclosure.

Referring to FIG. 3, the server 300 for storing and managing online threat data collects the online threat data from the online threat data providing server 200 (S310).

The server 300 for storing and managing online threat data analyzes the online threat data to extract the online threat string (S320).

Thereafter, the server 300 for storing and managing online threat data uses the online threat string as an index to generate information that can retrieve the online threat string and/or the online threat data (S330).

According to one embodiment, operation S330 includes extracting a token based on a space from the online threat string, and when the extracted token is stored as an index in the database 330, storing an identifier of the corresponding online threat data in an identifier item of the online threat data corresponding to the index in the database 330.

According to another embodiment, operation S330 includes extracting a token based on a space from the online threat string, and when the extracted token is not stored as an index in the database 330, storing the token as the index in the database 330 and then storing an identifier of the corresponding online threat data in an identifier item of the online threat data corresponding to the index.

The server 300 for storing and managing online threat data builds the database 330 using the information generated in operation S330 (S340).

FIG. 4 is an exemplary diagram for describing a general online threat data storage management process.

Generally, the online threat data is stored in a relational database as illustrated in FIG. 4.

When retrieving online threat data that includes a specific threat indicator word in such a relational database, it is confirmed whether the online threat data in the corresponding row includes the specific threat indicator word while retrieving the online threat data in order from a first row in the relational database. As a result of the confirmation, when the online threat data of the corresponding row includes the specific threat indicator word, the corresponding row is extracted, and when the online threat data of the corresponding row does not include the specific threat indicator word, the corresponding row is not extracted.

For example, when the specific threat indicator word is "harness," the process of retrieving the online threat data including the specific threat indicator word in the relational database is as follows. It is checked whether the "harness" is included in the online threat data of the corresponding row while retrieving the online threat data in order from the first row in the relational database. As a result of the confirmation, when the online threat data in the first row includes the "harness," the first row is extracted, and when the online threat data in the first row does not include the "harness," the first row is not extracted.

In FIG. 4, since the online threat data of the rows whose IDs correspond to doc_id_1, doc_id_2, and doc_id_4 includes the "harness," the online threat data of the rows corresponding to the doc_id_1, doc_id_2, and doc_id_4 may be extracted.

FIG. 5 is an exemplary diagram for describing an online threat data storage management process according to an embodiment of the present disclosure.

The server 300 for storing and managing online threat data stores the online threat data in the database 330 with an inverted index structure as illustrated in FIG. 5(*a*).

Specifically, the server 300 for storing and managing online threat data first extracts the online threat string from the collected online threat data, extracts the token based on a space from the online threat string, and determines whether the extracted token is stored as an index in the database 330.

For example, it is assumed that the online threat string corresponding to the identifier "doc1" is "The quick brown fox." In this case, the server 300 for storing and managing online threat data extracts the tokens "The," "quick," "brown," and "fox" based on a space from "The quick brown fox" which is the online threat string, and determines whether the terms "The," "quick," "brown," and "fox" are stored as indexes in a term item in the database.

As a result of the determination, when "The," "quick," "brown," and "fox" are stored as the indexes in the database, the server 300 for storing and managing online threat data stores the "doc1" the identifier item of the online threat data corresponding to the corresponding index.

As another example, it is assumed that the online threat string corresponding to the identifier "doc2" is "The quick brown fox jumps over the lazy dog." In this case, the server 300 for storing and managing online threat data extracts the tokens "The," "quick," "brown," "fox," "jumps," "over," "the," "lazy," and "dog," which are the online threat string, based on a space from "The quick brown fox jumps over the lazy dog," and determines whether the tokens "The," "quick," "brown," "fox," "jumps," "over," "the," "lazy," and "dog" are stored as the indexes in the term item in the database.

As a result of the determination, when "The," "quick," "brown," "fox," "jumps," "over," "the," "lazy," and "dog" are stored as the indexes in the database, the server 300 for storing and managing online threat data stores the "doc2" in the identifier item of the online threat data corresponding to the corresponding index.

As described above, the server 300 for storing and managing online threat data builds the database with the inverted index structure as illustrated in FIG. 5(*a*). Thereafter, when the online threat data retrieval request message is received from the user terminal 100, the server 300 for storing and managing online threat data extracts and provides the online threat data including the specific threat indicator word from the database 330 based on the online threat data retrieval request message.

For example, when the specific threat indicator word "fox" is extracted from the online threat data retrieval request message received from the user terminal 100, the server 300 for storing and managing online threat data is provided by extracting the identifiers "doc1, doc2, doc3, and doc4" of the online threat data corresponding to the "fox" from the database 330 as illustrated in FIG. 5(*b*).

The index used in this disclosure is like a browse page that allows users to see how many pages contents of main keywords at an end of a book exist on. Therefore, when there are indexes, the identifiers "doc1, doc2, doc3, and doc4" of the online threat data including the specific threat indicator word "fox" may be extracted.

As described above, there is an advantage in that both the structured data and unstructured data may be accommodated by generating the database with the inverted index structure based on the index of the online threat data.

Hereinabove, the embodiments of the present disclosure have been described with reference to FIGS. 1 to 5. In the description referring to FIG. 2, the case where the server 300 for storing and managing online threat data according to the embodiment of the present invention includes the online threat data collection unit 310, the online threat data analysis unit 320, the database 330, the online threat data retrieval unit 340, and the database management unit 350 is described as an example. Although not illustrated in the drawings, the server 300 for storing and managing online threat data may be configured to include a transceiver, a memory, and a processor.

The transceiver of the server 300 for storing and managing online threat data may communicate with arbitrary external devices. Furthermore, the server 300 for storing and managing online threat data may transmit and receive various data by connecting to the network through the transceiver. The transceiver 1200 may largely include a wired type and a wireless type. Since the wired type and the wireless type each have their own strengths and weaknesses, in some cases, the server 300 for storing and managing online threat data may provide both the wired type and the wireless type at the same time. Here, in the case of the wireless type, a wireless local area network (WLAN)-based communication method such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory of the server 300 for storing and managing online threat data may store various data temporarily or semi-permanently. An example of the memory may include a hard disk drive (HDD), a solid state drive (SSD), a flash memory, a read-only memory (ROM), a random access memory (RAM), or the like. The memory may be provided in a form built into the server 300 for storing and managing online threat data or in a detachable form.

The memory may store various data necessary for the operation of the server 300 for storing and managing online threat data, in addition to an operating program (OS) for running the server 300 for storing and managing online threat data, and a program for operating each configuration of the server 300 for storing and managing online threat data.

The processor of the server 300 for storing and managing online threat data may control the overall operation of the server 300. Specifically, the processor may load and execute programs stored in the memory. The processor may be implemented as an application processor (AP), a central processing unit (CPU), a microcontroller unit (MCU), or similar devices thereto according to hardware, software, or a combination thereof. In this case, the processor may be provided in an electronic circuit form performing a control function by processing an electrical signal in a hardware manner, and may be provided in a program or code form driving a hardware circuit in the software manner.

Meanwhile, the disclosed embodiments may be implemented in the form of a recording medium that stores instructions executable by a computer. The instructions may be stored in the form of the program code, and when executed by the processor, may generate program modules to perform operations of the disclosed embodiments. The recording medium may be implemented as a computer-readable recording medium.

The computer-readable recording medium includes all types of recording media storing instructions that may be decoded by a computer. For example, there may be the ROM, the RAM, a magnetic tape, a magnetic disk, a flash memory, an optical data storage device, and the like.

In addition, the computer-readable storage medium may be provided in the form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

According to an embodiment, the methods according to the diverse embodiments disclosed in this specification may be included and provided in a computer program product. The computer program product may be traded as a product between a seller and a purchaser. The computer program product may be distributed in the form of a machine-readable recording medium (for example, compact disc read only memory (CD-ROM)), or may be distributed (for example, download or upload) through an application store (for example, Play Store™) or may be directly distributed (for example, download or upload) between two user devices (for example, smart phones) online. In the case of the online distribution, at least some of the computer program products (for example, downloadable app) may be at least temporarily stored in a machine-readable recording medium such as a memory of a server of a manufacturer, a server of an application store, or a relay server or be temporarily created.

According to a server and method for storing and managing online threat data according to embodiments of the present disclosure, it is possible to accommodate both the structured data and unstructured data by generating the database with the inverted index structure based on the index of the online threat data.

According to a server and method for storing and managing online threat data according to embodiments of the present disclosure, when the retrieval request is made for the online threat data including the specific threat indicator word, it is possible to improve the retrieve performance by extracting and providing the identifier of the online threat data that matches the index corresponding to the specific threat indicator word in the database.

Technical effects of the present disclosure are not limited to the above-described technical effects, and technical effects that are not mentioned will be clearly understood by those skilled in the art to which the present disclosure pertains from the present specification and the accompanying drawings.

Features, structures, effects, etc., described in the above embodiments are included in at least one embodiment of the present disclosure, and are not necessarily limited only to one embodiment. Furthermore, features, structures, effects, etc., illustrated in each embodiment can be practiced by being combined or modified for other embodiments by those of ordinary skill in the art to which the embodiments pertain. Accordingly, the contents related to such combinations and modifications should be interpreted as being included in the scope of the present disclosure.

Although exemplary embodiments of the present disclosure have been mainly described hereinabove, these are only examples and do not limit the present disclosure. Those skilled in the art to which the present disclosure pertains may understand that several modifications and applications that are not described in the present specification may be made without departing from the spirit of the present disclosure. That is, each component specifically shown in the embodiments may be implemented by modification. In addition, differences associated with these modifications and applications are to be interpreted as being included in the scope of the present specification as defined by the following claims.

What is claimed is:

1. A server for storing and managing online threat data, the server comprising:
a database;
a processor; and
a memory storing instructions executable by the processor,
wherein the processor is configured to execute the instructions to:
collect the online threat data from an online threat data providing server,
analyze the online threat data to extract an online threat string, and use the online threat string as an index to generate information for retrieving the online threat data, and
store the generated information in the database,
wherein the processor is further configured to execute the instructions to:
extract tokens from the online threat string based on spaces in the online threat string,
determine whether the extracted tokens are stored as indexes in the database,
based on a token among the extracted tokens being stored as an index in the database, store an identifier of the online threat string in an identifier item corresponding to the index of the token in the database, and
assign a label indicating a frequency to each index of the indexes in the database and then sort the indexes according to the frequency to update the database.

2. The server of claim 1, wherein the processor is further configured to execute the instructions to, based on an online threat data retrieval request message being received from a user terminal, extract online threat data including a specific threat indicator word from the database based on the online threat data retrieval request message and provide the extracted online threat data to the user terminal.

3. A method of storing and managing online threat data, which is executed on a server for storing and managing the online threat data, the method comprising:
collecting the online threat data from an online threat data providing server;
analyzing the online threat data to extract an online threat string, and using the online threat string as an index to generate information for retrieving the online threat data; and
building a database using the generated information,
wherein the method further comprises:
extracting tokens from the online threat string based on spaces in the online threat string,
determining whether the extracted tokens are stored as indexes in the database,
based on a token among the extracted tokens being stored as an index in the database, storing an identifier of the online threat string in an identifier item corresponding to the index of the token in the database, and assigning a label indicating a frequency to each index of the indexes in the database and then sorting the indexes according to the frequency to update the database.

4. The method of claim 3, further comprising:

receiving an online threat data retrieval request message from a user terminal; and extracting online threat data including a specific threat indicator word from the database based on the online threat data retrieval request message and providing the extracted online threat data to the user terminal.

5. The server of claim 1, wherein the processor is further configured to execute the instructions to: based on a token among the extracted tokens not being stored as an index in the database, store, as an index in the database, the unstored token in the database and store the identifier of the online threat string in an identifier item corresponding to the index of the unstored token in the database.

6. The method of claim 3, further comprising: based on a token among the extracted tokens not being stored as an index in the database, storing, as an index in the database, the unstored token in the database and storing the identifier of the online threat string in an identifier item corresponding to the index of the unstored token in the database.

* * * * *